Feb. 21, 1939.   L. R. SCHROEDER   2,148,176
COMPOSITE SHEET
Filed Dec. 28, 1937

INVENTOR.
BY Leslie R. Schroeder.
Walter C. Ross.
ATTORNEY.

Patented Feb. 21, 1939

2,148,176

UNITED STATES PATENT OFFICE 2,148,176

COMPOSITE SHEET

Leslie R. Schroeder, South Hadley, Mass., assignor to American Tissue Mills, Holyoke, Mass., a corporation of Massachusetts Application December 28, 1937, Serial No. 182,050

1 Claim. (Cl. 154—55)

This invention relates to improvements in composite sheets and is directed to improvements in sheets such as may be made from separate plies of paper or the like.

The principal objects of the invention are directed to the provision of a composite sheet wherein an outer layer or ply of material such as paper is supported by a corrugated ply or layer, the former being provided with relatively wide substantially flat surfaces. The composite sheet of the invention is adapted for many and various purposes but is particularly adapted for window displays and all decorative purposes, the substantially flat surfaces affording space for carrying all types of ornamentation while suitably supported.

The composite sheet is rollable for shipping purposes and bendable so that it may be formed into various shapes and thus be readily adaptable to various uses without a loss of the advantages of the substantially flat surfaces.

Various other novel features and advantages of the invention will be hereinafter more fully referred to in the accompanying description of the invention.

Figure 1:
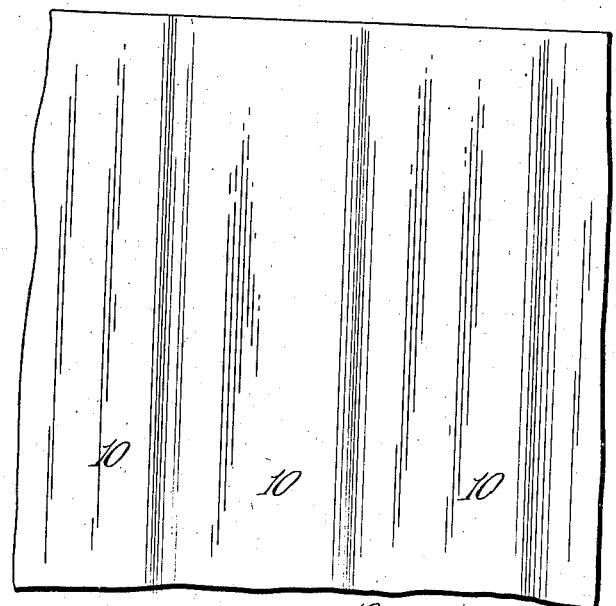
Fig. 1 is a plan view of a composite sheet embodying the novel features of the invention.
Figure 2:
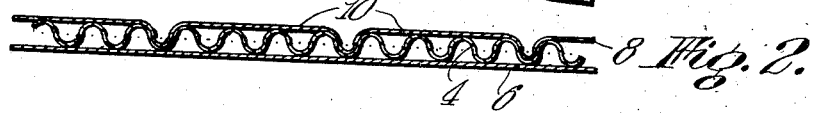
Fig. 2 is a transverse sectional view through the sheet shown in Fig. 1.
Figure 3:
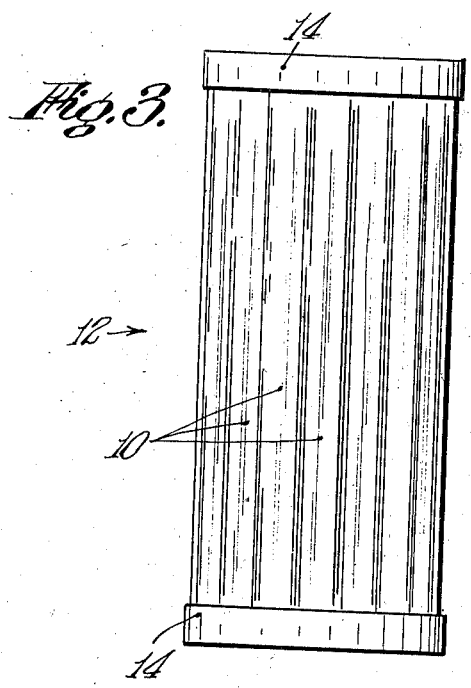
Figs. 3 and 4 are perspective views to explain certain features of the invention.
Figure 4:
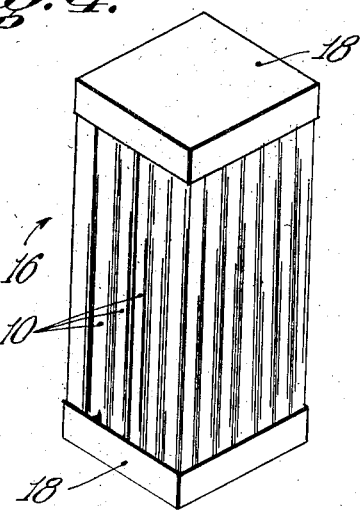

Referring now to the drawing more in detail the invention will be fully described.

The composite sheet 2 of the invention includes a central corrugated layer or layers of material 4 which is secured to a backing layer or layers 6 and an outer layer or facing 8. The backing 6 and central layer 4 preferably consist of paper and the layers are secured together by any suitable means such as an adhesive.

The backing 6 and central corrugated layer 4 not only give to the composite sheet a thickness or bulk without excessive weight, which is desirable, but provide a sheet which is adapted to withstand strains and stresses. Furthermore, the sheet may be conveniently rolled for packing and shipping and formed into various shapes such as columns which are circular, rectangular or otherwise in cross sections.

The facing layer or layers 8 are supported by and secured to the central layer 4 by an adhesive or the like and this layer may be of paper of the desired kind and quality. Preferably the facing layer 8 will be of such material as lends itself readily to ornamental purposes and which may be decorated or otherwise treated with color or whatever desired.

The layer 8 is secured to and supported by the central layer in such a way that a plurality of substantially flat surfaces or faces 10 are provided. This is accomplished by having the outer layer extend downwardly into certain only of the corrugations of the central layer 4. That is, instead of the outer layer following all of the corrugations of the central layer it is arranged so that the said layer conforms to certain only of the corrugations.

In the drawings the outer layer conforms to every fifth corrugation, thus providing substantially flat surfaces or faces 10. Faces of other widths may be provided by varying the number of corrugations between those with which the outer layer conforms.

The flat faces 10 provide unbroken surfaces for such decoration as it is desired to apply thereto and yet the sheet is sufficiently flexible to be rolled up for packing and shipment and it may, in use, be formed into various shapes without destroying or impairing the substantially flat faces 10.

For instance, a sheet of the material 2 may be rolled to form a cylinder 12 such as is used for display purposes and there may be caps or rings 14 to hold the cylindrical formation. When so formed the substantially flat faces 10 extend longitudinally of the form and present an artistic effect.

In another way, a section of the composite sheet 2 may be formed into a rectangular column 16 with caps 18 at top and bottom thereof. The flat surfaces 10 will extend longitudinally of the column as shown.

The foregoing is merely illustrative of the adaptability of the sheet for decorative purposes, it being possible to provide various shapes and forms incorporating the multiplicity of separated flat faces.

Not only is the composite sheet adapted for many and various purposes by reason of the flat faces presented but the structure is such that the sheet has the desired bulk and weight without excessive weight but its strength is enhanced by the novel formation.

Various changes and modifications may be made in the form of the invention without departing from the spirit and scope thereof and I therefore prefer to be limited, if at all, by the appended claim rather than by the foregoing description.

I claim:

As a new article of manufacture, a composite sheet comprising in combination, a corrugated member having alternate hills and valleys disposed transversely thereof, a sheet secured thereto having relatively flat portions thereof on sets of adjacent hills, the said sheet being relatively longer than a given length of said member with portions thereof between the said flat portions extending downwardly into and conforming to the valleys between the adjacent hills of adjacent sets thereof.

LESLIE R. SCHROEDER.